United States Patent [19]

Derby et al.

[11] Patent Number: 5,761,400
[45] Date of Patent: Jun. 2, 1998

[54] METHOD AND SYSTEM FOR INCREASING THE SPEED OF A Z-BUFFER PROCESS

[75] Inventors: Herbert G. Derby, Boulder Creek; Brent Pease, San Jose, both of Calif.

[73] Assignee: Apple Computer, Inc., Cupertino, Calif.

[21] Appl. No.: 520,056

[22] Filed: Aug. 28, 1995

[51] Int. Cl.$^6$ .............................. G06F 15/72; G06F 15/62
[52] U.S. Cl. ........................ 395/122; 395/121; 395/509
[58] Field of Search .................................. 395/121, 122, 395/126, 502, 508, 509, 119

[56] References Cited

U.S. PATENT DOCUMENTS

| | | | |
|---|---|---|---|
| 5,043,922 | 8/1991 | Matsumoto | 395/122 |
| 5,245,700 | 9/1993 | Fossum | 395/122 |
| 5,249,264 | 9/1993 | Matsumoto | 395/134 |
| 5,265,199 | 11/1993 | Catlin | 395/122 |
| 5,278,949 | 1/1994 | Thayer | 395/126 |
| 5,377,313 | 12/1994 | Scherbl | 395/122 |
| 5,394,516 | 2/1995 | Winser | 395/119 |
| 5,517,603 | 5/1996 | Kelley et al. | 395/126 |
| 5,579,454 | 11/1996 | Billyard et al. | 395/121 |

FOREIGN PATENT DOCUMENTS

| | | |
|---|---|---|
| 0314288 | 9/1988 | European Pat. Off. . |
| 0329101 | 2/1989 | European Pat. Off. . |
| 0455374 | 4/1991 | European Pat. Off. . |
| 0681271 | 3/1995 | European Pat. Off. . |

OTHER PUBLICATIONS

James D. Foley/The George Washington University, Andries Van Dam/Brown University, "Fundamentals of Interactive Computer Graphics", pp. 560–561, Addison–Wesley Publishing Company.

Dave Burgoon; "Pipelined graphics engine speeds 3-D image controls"; Electronic Design; Jul. 23, 1987, pp. 143–150.

Margery S. Conner; "Processor for 3-D graphics"; EDN Mar. 30, 1989 pp. 97–102.

Webster, Graeme; "3D Computer graphics–the Z Buffer algorithm" Journal: EXE Apr. 1992 v6, N10 p. 38(4).

The Art of Computer Programming, vol. 3/Sorting and Searching; D. Knuth, c.1973; pp. 248–252, 560–561.

Primary Examiner—Meng-Ai T. An
Attorney, Agent, or Firm—Sawyer & Associates

[57] ABSTRACT

A method for increasing the speed of a Z-buffer process. The method operates on the observation that groups of points in a scan-line of a polygon are either all visible or all obscured by existing points in the frame buffer. The method processes visible points separately from obscured points. The method only calculates changes in point intensity for the groups of visible points. In addition, the termination of the two separate processes is controlled by placing sentinels at the edge of each scan-line of the polygon so that the comparison of the point's z-values also act as a check for process termination.

48 Claims, 6 Drawing Sheets

METHOD AND SYSTEM FOR INCREASING THE SPEED OF A Z-BUFFER PROCESS

FIELD OF THE INVENTION

The present invention relates to a method for increasing the speed of a conventional z-buffer process, and more particularly to a method for reducing the number of comparisons and calculations performed a z-buffer process, using sentinels.

BACKGROUND OF THE INVENTION

Graphic display systems, typically comprise a processor, a frame buffer, a display monitor, and a display controller. The frame buffer is a digital memory for storing the image to be displayed as a series of binary values, which are updated by the processor. The display includes a screen having an array of picture elements or pixels. Each pixel represents a dot on the screen and can be programmed to a particular color with thousands of pixels programmed to represent a displayed image. The frame buffer stores these pixel values. The display controller is typically the interface for passing the contents of the frame buffer to the display by converting the data from the frame buffer to a video signal for display by the monitor.

A 3D graphics object is often represented as a mesh or set of vertices defining polygon surfaces. Given a viewing angle, a hidden surface removal process determines which surfaces of the 3D object are visible so that only the visible surfaces are displayed. Hidden surface removal involves depth comparisons among the polygons to determine which surfaces are obscured by others. The assumption made in the depth comparison is that the farther an object is from the viewpoint, the more likely the object is to be totally or partially obscured by one closer to the viewpoint. As the processor performs the depth comparison, the image in the frame buffer is updated and sent to the display. One of the most commonly used hidden surface removal methods is the z-buffer process. The z-buffer process uses the frame buffer for storing the intensity of each point, and in addition, uses a separate z-buffer for storing the depth or z-value for every visible point. When a new point from the polygon is to be written to the frame buffer, the z-value of the point is compared to the z-value of that point stored in the z-buffer. If the comparison indicates that the new point is in front of the point stored in the frame buffer, then the new point is written to the frame buffer and the z-buffer is updated with the new z-value. If not, no action is taken.

The z-buffer process is often a bottleneck to the performance of the graphic display system because the method requires many comparisons and many calculations per iteration. Usually, the less comparisons and calculations per iteration performed, the faster the process, and the faster system performance.

Accordingly, what is needed is a faster more efficient z-buffer process. The present invention addresses such a need.

SUMMARY OF THE INVENTION

The present invention provides a method for removing hidden surfaces of a plurality of overlapping polygons where each one of the plurality polygons is represented by a plurality of scan-lines of points, wherein each one of the points includes a intensity value and a depth value.

The method comprises the steps of processing each one of the plurality of polygons one scan-line at a time, wherein the scan-line currently being processed is the current scan-line. A plurality of visible points in the current scan-line are processed separately from a plurality of obscured points in the current scan-line. The processing of the plurality of visible points is controlled using a first sentinel, and the processing of the plurality of obscured points is controlled using a second sentinel, wherein changes in the intensity values of the plurality of obscured points are not calculated during the processing of the plurality of obscured points.

According to the system and method disclosed herein, the present invention reduces computing time of the z-buffer process by one-third over prior methods, thereby increasing overall system performance.

DESCRIPTION OF THE INVENTION

The present invention relates to an improvement in z-buffer processes. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
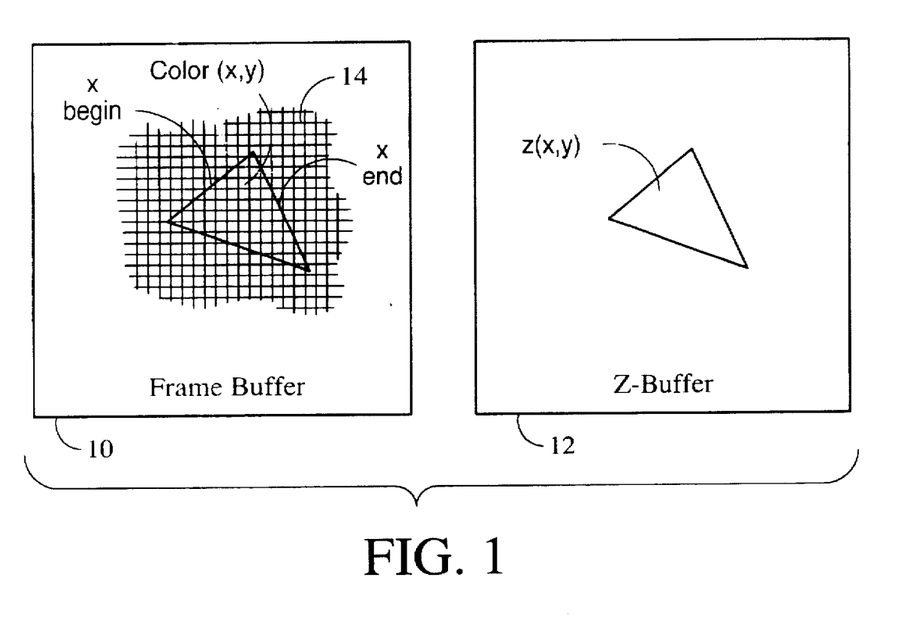
FIG. 1 is a block diagram of a frame buffer and a z-buffer.

FIG. 1 is a block diagram of a frame buffer 10 and a z-buffer 12. The frame buffer 10 is an array of (x, y) coordinates 14 corresponding to pixels on a display. The frame buffer 10 is shown here storing the image of a triangle. At each (x,y) coordinate 14 in the frame buffer 10, the intensity or color of the point is stored. At each corresponding (x,y) location in the z-buffer, the depth z(x, y) is stored. In a conventional z-buffer process, each horizontal row of a polygon is known as a scan-line and is processed separately. Each scan-line has a beginning x-coordinate, called xbegin, and an ending x-coordinate, called xend. The color at each point is typically represented by a combination of three values, a red value, a green value and a blue value.

Figure 2:
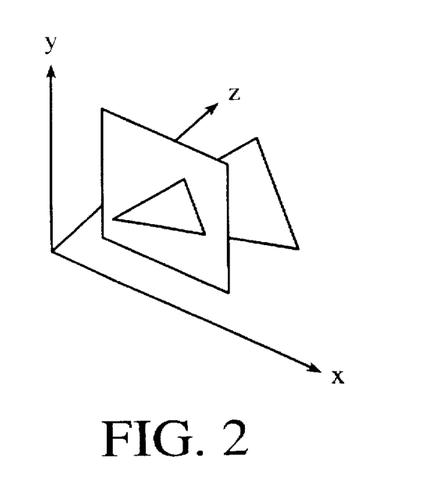
FIG. 2 is a block diagram of a triangle penetrating a rectangle in three-dimensional space.
Figure 3:
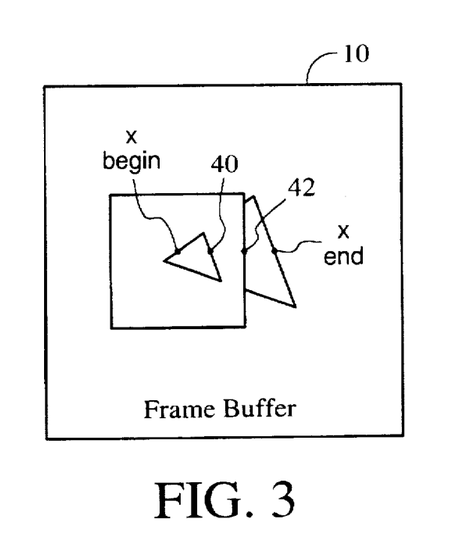
FIG. 3 is a diagram depicting which row of the triangle and the rectangle of FIG. 2 are visible in a frame buffer.

FIG. 2 is a three-dimensional diagram showing the triangle penetrating a rectangle and graphically illustrates the problem facing the z-buffer process. As shown in FIG. 3, assume that the rectangle already exists in the frame buffer 10. The function of the z-buffer process is to determine which points of the triangle are visible and which points are obscured by the existing points of the rectangle when updating the pixel values in the frame buffer 10.

Figure 4:
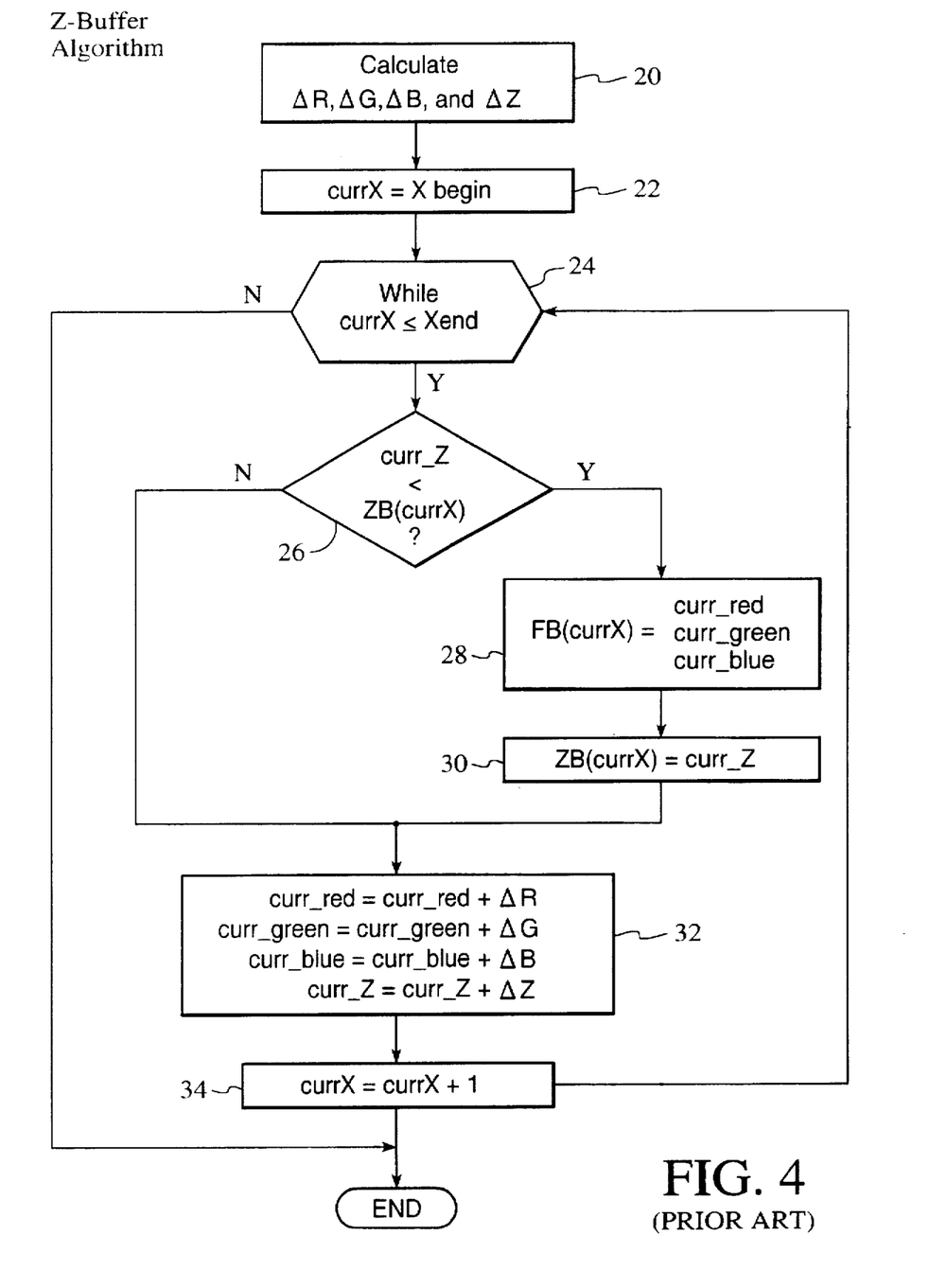
FIG. 4 is a flow chart depicting a conventional z-buffer process.

Referring now to FIG. 4, a flowchart for a conventional z-buffer process is shown. Since a polygon is typically shaded and has varying depth, the red, green, blue and z values change for each point between xbegin and xend. To properly update the frame buffer 10, the differences between the red, green, blue, and z values from one point to the next in the current scan-line are calculated in step 20.

The difference between the red, green, blue, and z values from one point to the next are referred to as deltas; delta-red, delta-green, delta-blue, and delta-z. The depth of xbegin and xend, and the delta-z of a scan-line are calculated according to well known methods. See for example, "Fundamentals of Interactive Computer Graphics," Ch. 15.5, by J. D. Foley and A. Van Dam, 1984. Methods for calculating the delta values for the color are also well known. However, a brief description of how the delta red, green, and blue values are calculated is given below for clarity.

As is apparent to one skilled in the art, the color deltas are calculated by subtracting the color value at point xend from the color value at xbegin, and by dividing the difference by the number of points in the scan-line. For example, assume that there are five points the scan-line and that the color values of xbegin all equal 0.5 (grey) and the color values of xend all equal 1.0 (white), then the color delta values are one-tenth, (1.0–0.5)/5=0.1. Thus, delta-red equals 0.1, delta-green equals 0.1, and delta-blue equals 0.1. The color and z value at each point along the scan-line is calculated by adding the color and z value for the previous point with the delta values. For instance, the red value of a point in the scan-line will equal the red value of the previous point plus the delta-red.

After the delta values are calculated, the process processes each point in the scan-line. When a point is being evaluated, it is the current point The x-value, z-value, red-value, green-value, and blue-value, of the current point are called currentx, currentz, curr_red, curr_green, and curr_blue. Currentx is initially set equal to xbegin in step 22 and the value of currentx is compared with the value of xend in step 24.

While currentx is less than xend in step 24, the process loops and compares currentz (the depth at currentx) to the depth of currentx stored in the z-buffer in step 26. If the currentz is less than the z-buffer value at point currentx, then the point is closer to the viewer than the point whose intensity is currently in the frame buffer 10. The frame buffer 10 is then updated with the point's color values; curr_red, curr_green, and curr_blue in step 28, and the z_buffer is updated with the point's depth value, currentz in step 30. When currentz is greater than the z_buffer value, the frame buffer 10 is not updated since the point is not visible.

The color values for the next point curr_red, curr_green, and curr_blue, and currentz are then calculated using the delta values in step 32, and the value of currentx is incremented in step 34. When the value of currentx becomes greater than xend in step 24, the end of the scan-line has been reached and the process ends.

As shown in FIG. 4, a conventional z-buffer process moves across a scan-line and performs several operations for each point. In step 24, each point is checked to determine whether the point is the last point in the scan-line. And in step 32, the color and currentz for each point are updated regardless of whether the point is visible or not. These are unnecessary steps as that hinder the process's performance.

According to the present invention, the conventional z-buffer process is improved through the observation that groups of points in a scan-line are either all visible or all obscured by existing points in the frame buffer. For example, referring again to FIG. 3, the triangle is shown penetrating a rectangle that already exist in the frame buffer. The groups of points between xbegin and point 40, and between point 42 and xend are visible, while the group of points between point 40 and 42 are obscured by the rectangle.

Figure 5:
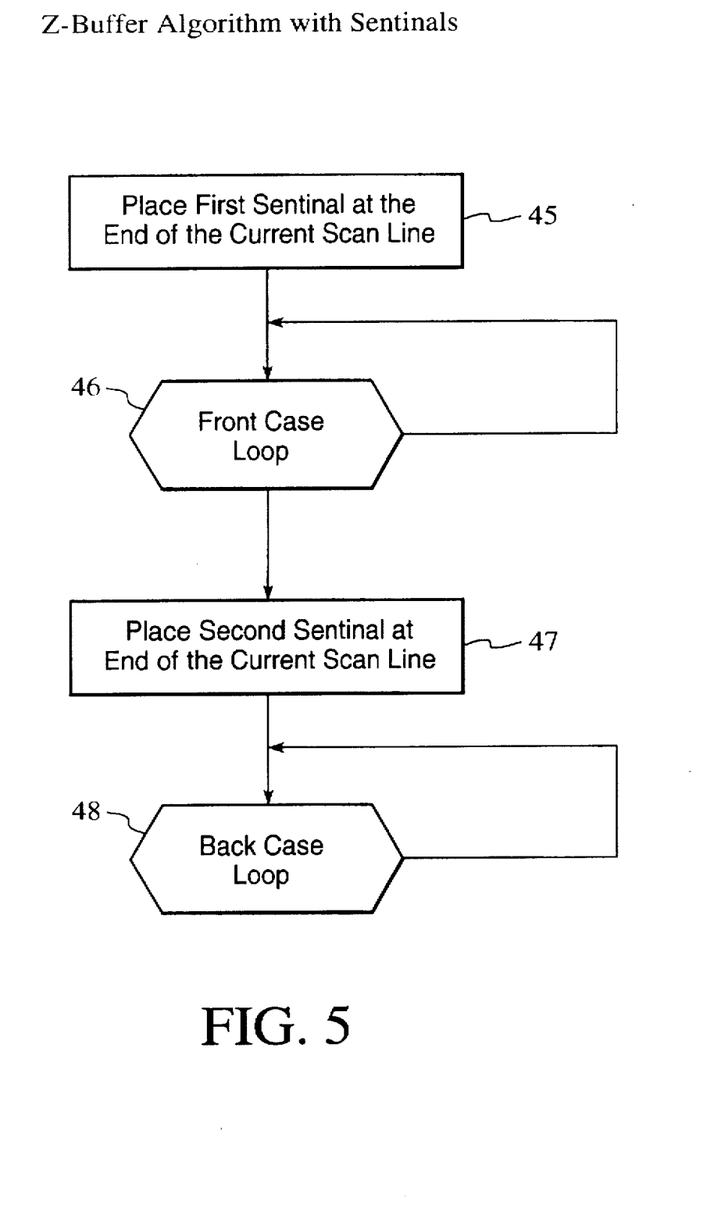
FIG. 5 is a flow chart depicting the z-buffer process of the present invention.

Referring now to FIG. 5, a flowchart of the z-buffer process of the present invention is shown in which groups of visible points are processed separately from groups of obscured points. Groups of visible points are processed in a front case loop 46, and groups of obscured points are processed in a back case loop 48. The processing of the groups of visible points is called the front case, since the points are in front of the image in the frame buffer. The processing of obscured points is called the back case, since the points are in back of the image in the frame buffer. Instead of calculating the color for each point in the scan-line, the color is only calculated for the points in the front case to save processing time.

In addition to processing groups of visible points separately from obscure points, the present invention also provides for the use of sentinels to further increase the speed of conventional z-buffer processes. A sentinel is well known device for increasing speed of a search through a list by placing an artificial record at the end of the list to delimit the end of the list so that processing ends gracefully. Conventional z-buffer processes have not as of yet incorporated the use of sentinels, but instead have checked each point in a scan-line to determine whether processing of the scan-line should cease, as shown in step 24 of FIG. 4. According to the present invention, sentinels are used to delimit the end of the scan-line. A first sentinel is placed at the end of the current scan-line in step 45 to control processing of the front case loop 46; and a second sentinel is placed at the end of the current scan-line in step 47 to control processing of the back case loop 48. This enables the present invention to combine step 24 of FIG. 4 with the comparison of the depth values in step 26 to increase the speed of the z-buffer process.

Figure 6:
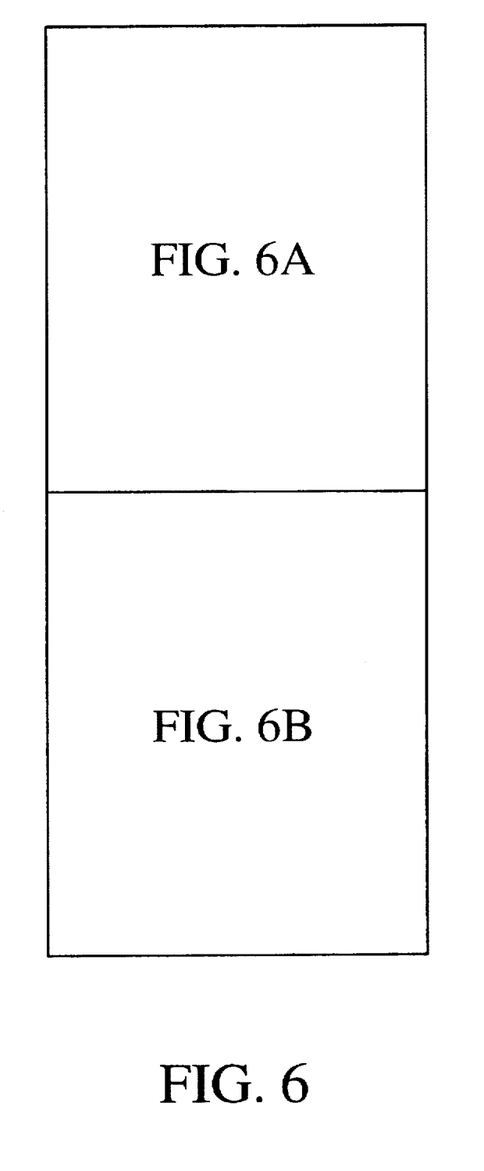
FIG. 6 is a detailed flow chart depicting the z-buffer process of the present invention.
Figure 6A:
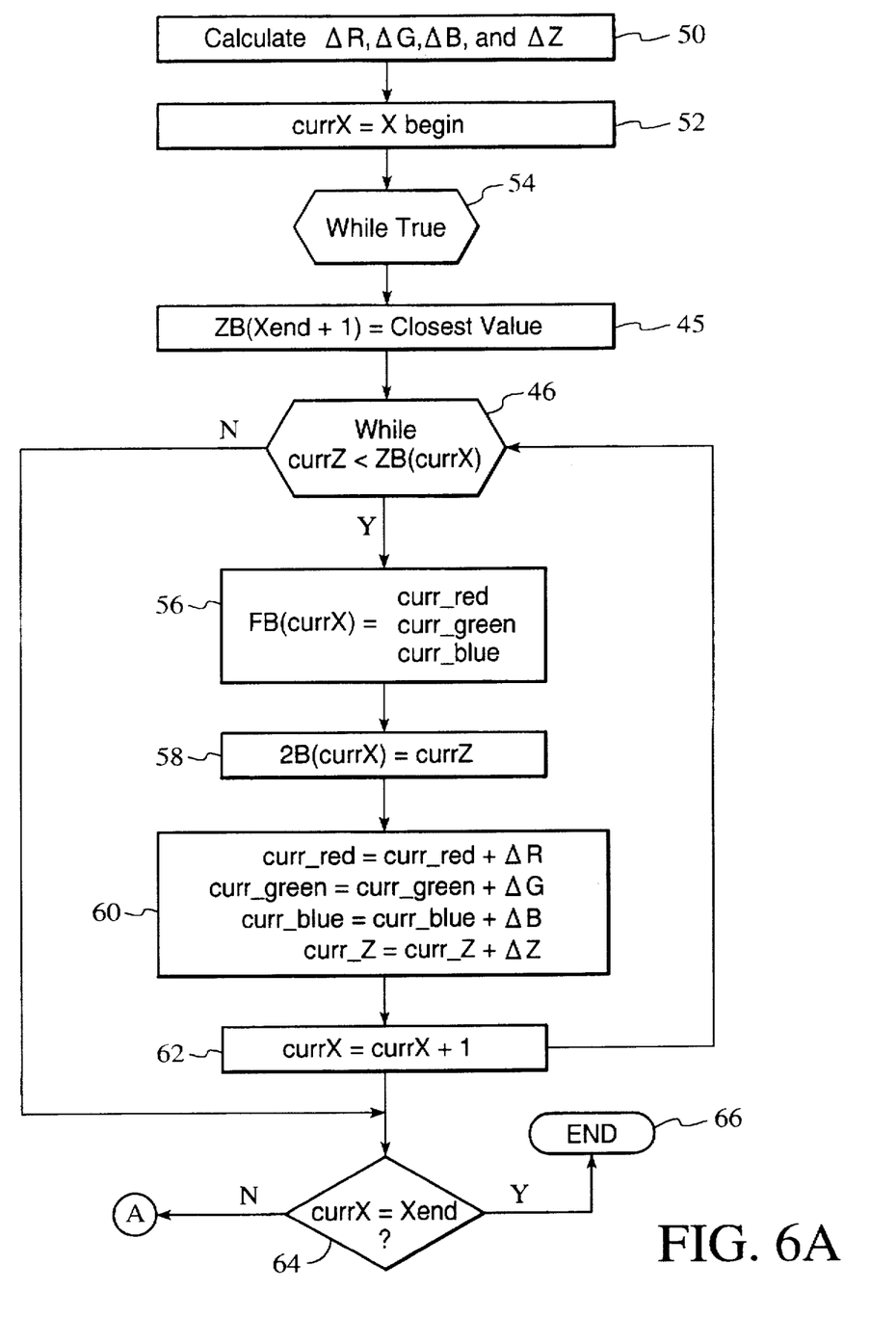
FIG. 6A is a flow chart of a first portion of the z-buffer process shown in FIG. 6.
Figure 6B:
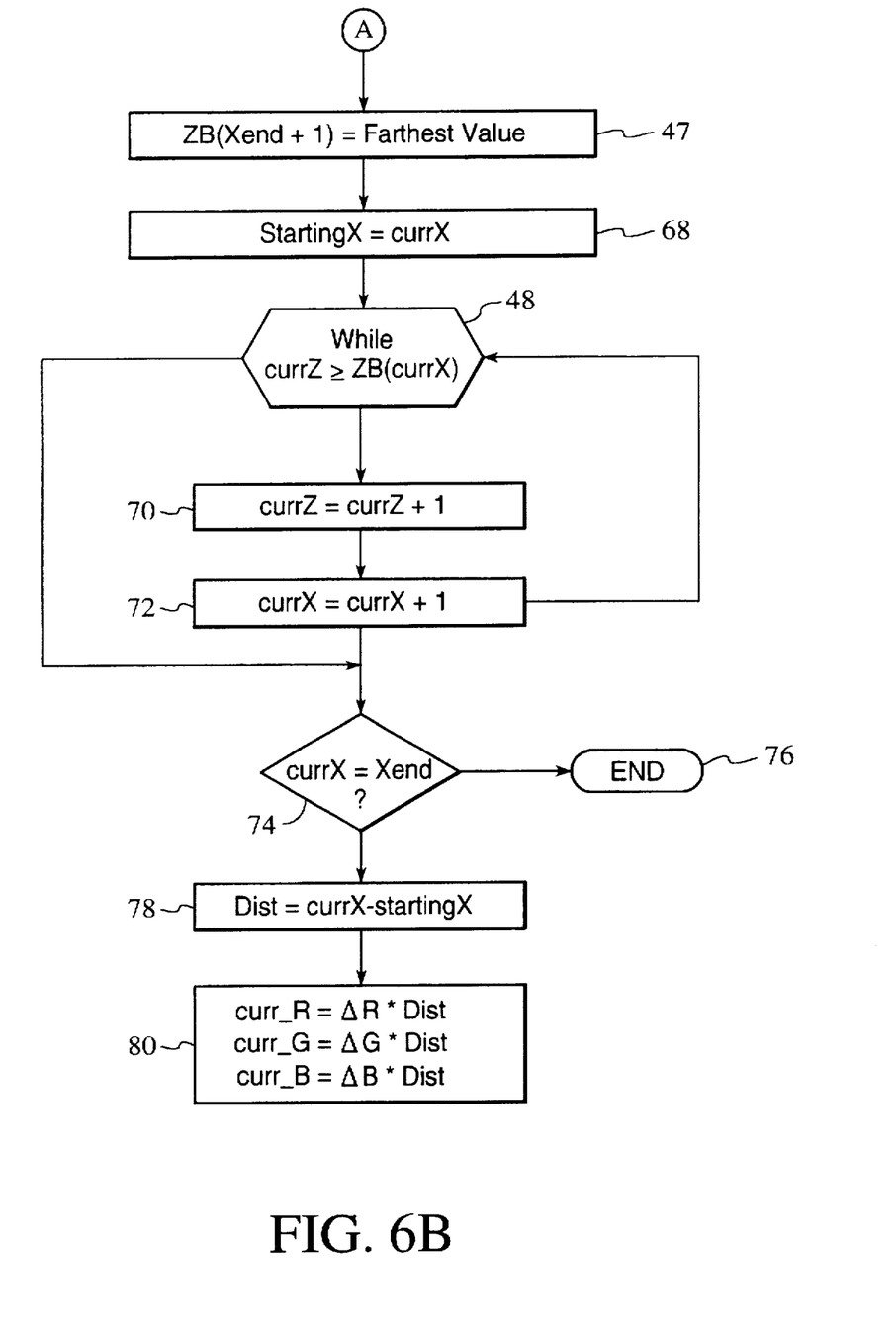
FIG. 6B is a flow chart of a second portion of the z-buffer process shown in FIG. 6.

Referring now to FIG. 6, two portions, A and B, of a flow chart in accordance with the method and system are shown. FIGS. 6A and 6B further depict a first and second portion, respectively, of a detailed flowchart of the z-buffer process of the present invention is shown. The method processes one scan-line at a time from the point xbegin to the point xend.

Preliminarily, the delta-red, delta-green, delta-blue, and delta-z values for the scan-line are calculated in step 50, as described above. In a preferred embodiment, these values are passed to the z-buffer process as parameters. Next, currentx is set equal to xbegin in step 52. An infinite loop is performed in step 54, which is only terminated in the front case loop 46 or in the back case loop 48 when the sentinels indicate that the end of the scan-line has been reached.

The first sentinel is placed at the end of the scan-line in step 45 by setting the point xend in the z-buffer equal to the closest or smallest value that the z-buffer is capable of representing. In a preferred embodiment, the closest value in the z-buffer is zero.

Next, the front case loop 46 compares currentz (the depth at currentx) to the depth of the point currentx stored in the z-buffer. If the currentz is less than the z-buffer value, the frame buffer is updated with the point's color values, curr_red, curr_green, and curr_blue in step 56. The z_buffer is updated with currentz in step 58. The color values for the next point, curr_red, curr_green, and curr_blue, and currentz are updated using the delta values in step 60. The value of currentx is incremented in step 62, and the front case loop 46 is repeated.

Thus, the front case loop 46 is performed while each point remains visible or until the end of the scan-line is reached, which is indicated by the sentinel. When the end of the scan-line is reached, the sentinel will terminate the loop, since the depth of a point will not be less than the closest value possible in the z-buffer.

After the front case loop 46, currentx is checked to see if its at the end of the scan-line in step 64. If the end of the scan-line has been reached, then the process is terminated in step 66.

When the currentz is greater than the z-buffer value in the front case loop comparison 46, the point is obscured. This begins the back case 48 for processing a group of obscured points. The second sentinel is placed at the end of the scan-line in step 47 by setting the point xend in the z-buffer equal to the farthest value that the z-buffer is capable of representing. A variable called startx is set equal to xbegin in step 68 in order to count how many obscured points are processed by the back case loop 48.

The back case loop 48 compares currentz (the depth at currentx) to the depth of the point currentx stored in the z-buffer. If the currentz is greater than or equal to the z-buffer value, only the currentz is updated using the delta-z value in step 70. The value of currentx is incremented in step 72, and loop 48 is repeated.

Thus, the back case 58 is performed while each point remains obscured, or until the second sentinel indicates that the end of the scan-line has been reached. The sentinel will indicate the end of the scan-line because the depth of a point will not be greater than the farthest value possible in the z-buffer. After the back case loop 48, currentx is checked to see if its at the end of the scan-line in step 74. If the end of the scan-line has been reached, then the process is terminated in step 76.

If the end of the scan-line has not been reached in step 74, then the color values are updated for the new currentx. In step 78, the number of points in the obscured group, or the distance traveled in the scan-line, is counted by subtracting startingx from currentx. The color values curr_red, curr_green, and curr_blue, and currentz are then updated by multiplying the delta values by the distance in step 80.

According to the present invention, the double comparison performed by a conventional z-buffer process (steps 24 and 26 in FIG. 4) have been combined into one comparison through the use sentinels and by separately processing visible points from obscured points. In addition, the back case loop 48 is simplified in that only currentz and currentx are incremented, rather than incrementing the color values of obscured points, which waste processing time. Accordingly, the z-buffer process of the present invention reduces computing time by one-third over prior methods.

A method for reducing the number of comparisons and calculations performed by a z-buffer process has been disclosed that includes two loops, one for processing visible points and one for processing obscured points. Software written according the present invention is intended to reside in some form of computer readable medium, such as memory or disk, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for removing hidden surfaces of a plurality of overlapping polygons where each one of the plurality of polygons is represented by a plurality of scan-lines of points, wherein each one of the points includes an intensity value and a depth value, the method comprising the steps of:

(a) processing each one of the plurality of polygons at least one scan-line at a time, wherein the scan-line currently being processed is the current scan-line;

(b) separately processing a plurality of visible points in the current scan-line from a plurality of obscured points in the current scan-line; and (c) processing the plurality of obscured points so that changes in the intensity values of the plurality of obscured points are not calculated during the processing of the plurality of obscured points.

2. A method as in claim 1 wherein in step (b) further includes the step of:

(b1) controlling the processing of the plurality of visible points using a first sentinel.

3. A method as in claim 2 wherein in step (c) further includes the step of:

(c1) controlling the processing of the plurality of obscured points using a second sentinel.

4. A method as in claim 3 wherein the intensity values are stored in a frame buffer and the depth values are stored in a z-buffer.

5. A method as in claim 4 wherein the processing step (b) further includes the steps of:

(b3) calculating the intensity values for each one of the first plurality of visible points; and (b4) writing the intensity values into the frame buffer.

6. A method as in claim 5 wherein the processing step (a) further includes the steps of:

(a1) representing the depth of each one of the point by a z-value; and (a2) calculating a delta-z and a delta-intensity for the current scan-line.

7. A method as in claim 6 wherein step (b) further includes the steps of:

(b5) calculating a z-value for each one of the visible points; and (b6) writing the z-value for each one of the visible points into the z-buffer.

8. A method as in claim 7 wherein the processing step (c) further includes the step of:

(c2) calculating the depth for each one of the plurality of obscured points.

9. A method as in claim 8 wherein the processing step (c) further includes the step of:

(c3) calculating the intensity value for a last point in the plurality of obscured points after the processing of the plurality of obscured points has ended.

10. A computer readable medium containing program instructions for removing hidden surfaces of a plurality of overlapping polygons where each one of the plurality of polygons is represented by a plurality of scan-lines of points, wherein each one of the points includes an intensity value and a depth value, the program instructions for:

(a) processing each one of the plurality of polygons at least one scan-line at a time, wherein the scan-line currently being processed is the current scan-line;

(b) separately processing a plurality of visible points in the current scan-line from a plurality of obscured points in the current scan-line; and (c) processing the plurality of obscured points so that changes in the intensity values of the plurality of obscured points are not calculated during the processing of the plurality of obscured points.

11. A computer readable medium as in claim 10 wherein in instruction (b) further includes the instruction of:
 (b1) controlling the processing of the plurality of visible points using a first sentinel.

12. A computer readable medium as in claim 11 wherein in instruction (c) further includes the instruction of:
 (c1) controlling the processing of the plurality of obscured points using a second sentinel.

13. A computer readable medium as in claim 12 wherein the intensity values are stored in a frame buffer and the depth values are stored in a z-buffer.

14. A computer readable medium as in claim 13 wherein the processing instruction (b) further includes the instructions of:
 (b3) calculating the intensity values for each one of the first plurality of visible points; and
 (b4) writing the intensity values into the frame buffer.

15. A computer readable medium as in claim 14 wherein the processing instruction (a) further includes the instructions of:
 (a1) representing the depth of each one of the point by a z-value; and
 (a2) calculating a delta-z and a delta-intensity for the current scan-line.

16. A computer readable medium as in claim 15 wherein instruction (b) further includes the instructions of:
 (b5) calculating a z-value for each one of the visible points; and
 (b6) writing the z-value for each one of the visible points into the z-buffer.

17. A computer readable medium as in claim 16 wherein the processing instruction (c) further includes the instruction of:
 (c2) calculating the depth for each one of the plurality of obscured points.

18. A computer readable medium as in claim 17 wherein the controlling instruction (d) further includes the instruction of:
 (d2) calculating the intensity value for a last point in the plurality of obscured points after the processing of the plurality of obscured points has ended.

19. A method for removing hidden surfaces of a plurality of overlapping polygons where each one of the plurality polygons is represented by a plurality of scan-lines of points, wherein each one of the points includes a intensity value and a depth value, the method comprising the steps of:
 (a) processing each one of the plurality of polygons at least one scan-line at a time, wherein the scan-line currently being processed is the current scan-line;
 (b) separately processing a plurality of visible points in the current scan-line from a plurality of obscured points in the current scan-line;
 (c) controlling the processing of the plurality of visible points; and
 (d) controlling the processing of the plurality of obscured points wherein changes in the intensity values of the plurality of obscured points are not calculated during the processing of the plurality of obscured points.

20. A method as in claim 19 wherein in step (c) a first sentinel used to control the processing of the plurality of visible points.

21. A method as in claim 20 wherein in step (d) a second sentinel used to control the processing of the plurality of visible points.

22. A method as in claim 21 wherein the intensity values are stored in a frame buffer and the depth values are stored in a z-buffer.

23. A method as in claim 22 wherein the processing step (b) further includes the steps of:
 (b1) calculating the intensity values for each one of the first plurality of visible points; and
 (b2) writing the intensity values into the frame buffer.

24. A method as in claim 23 wherein the processing step (a) further includes the steps of:
 (a1) representing the depth of each one of the point by a z-value; and
 (a2) calculating a delta-z and a delta-intensity for the current scan-line.

25. A method as in claim 24 wherein step (b) further includes the steps of:
 (b3) calculating a z-value for each one of the visible points; and
 (b4) writing the z-value for each one of the visible points into the z-buffer.

26. A method as in claim 25 wherein the calculating step (b1) further includes the steps of:
 (b1i) calculating the intensity value for a current point by adding the delta-intensity for the current scan-line to the intensity value of the previous point.

27. A method as in claim 26 wherein the calculating step (b3) further includes the steps of:
 (b3i) calculating the z-value for a current point by adding the delta-z for the current scan-line to the z-value of the previous point.

28. A method as in claim 27 wherein the controlling step (d) further includes the step of:
 (d1) calculating the depth for each one of the plurality of obscured points.

29. A method as in claim 28 wherein the controlling step (d) further includes the step of:
 (d2) calculating the intensity value for a last point in the plurality of obscured points after the processing of the plurality of obscured points has ended.

30. A method as in claim 29 wherein the calculating step (d2) further includes the step of:
 (d2i) multiplying the number of points in the plurality of obscured points by the delta-intensity value for the current scan-line.

31. A computer readable medium containing program instructions for removing hidden surfaces of a plurality of overlapping polygons where each one of the plurality polygons is represented by a plurality of scan-lines of points, wherein each one of the points includes a intensity value and a depth value, the program instructions for:
 (a) processing each one of the plurality of polygons at least one scan-line at a time, wherein the scan-line currently being processed is the current scan-line;
 (b) separately processing a plurality of visible points in the current scan-line from a plurality of obscured points in the current scan-line;
 (c) controlling the processing of the plurality of visible points; and
 (d) controlling the processing of the plurality of obscured points wherein changes in the intensity values of the plurality of obscured points are not calculated during the processing of the plurality of obscured points.

32. A computer readable medium as in claim 31 wherein in instruction (c) a first sentinel used to control the processing of the plurality of visible points.

33. A computer readable medium as in claim 32 wherein in instruction (d) a second sentinel used to control the processing of the plurality of visible points.

34. A computer readable medium as in claim 33 wherein the intensity values are stored in a frame buffer and the depth values are stored in a z-buffer.

35. A computer readable medium as in claim 34 wherein the processing instruction (b) further includes the instructions of:
   (b1) calculating the intensity values for each one of the first plurality of visible points; and
   (b2) writing the intensity values into the frame buffer.

36. A computer readable medium as in claim 35 wherein the processing instruction (a) further includes the instructions of:
   (a1) representing the depth of each one of the point by a z-value; and
   (a2) calculating a delta-z and a delta-intensity for the current scan-line.

37. A computer readable medium as in claim 36 wherein instruction (b) further includes the instructions of:
   (b3) calculating a z-value for each one of the visible points; and
   (b4) writing the z-value for each one of the visible points into the z-buffer.

38. A computer readable medium as in claim 37 wherein the calculating instruction (b1) further includes the instructions of:
   (b1i) calculating the intensity value for a current point by adding the delta-intensity for the current scan-line to the intensity value of the previous point.

39. A computer readable medium as in claim 38 wherein the calculating instruction (b3) further includes the instructions of:
   (b3i) calculating the z-value for a current point by adding the delta-z for the current scan-line to the z-value of the previous point.

40. A computer readable medium as in claim 39 wherein the controlling instruction (d) further includes the instruction of:
   (d1) calculating the depth for each one of the plurality of obscured points.

41. A computer readable medium as in claim 40 wherein the controlling instruction (d) further includes the instruction of:
   (d2) calculating the intensity value for a last point in the plurality of obscured points after the processing of the plurality of obscured points has ended.

42. A computer readable medium as in claim 41 wherein the calculating instruction (d2) further includes the instruction of:
   (d2i) multiplying the number of points in the plurality of obscured points by the delta-intensity value for the current scan-line.

43. A method for removing hidden surfaces of a plurality of overlapping polygons where each one of the plurality polygons is represented by a plurality of scan-lines of points, wherein each one of the points includes a intensity value and a depth value, wherein the intensity values are stored in a frame buffer and the depth values are stored in a z-buffer, the method comprising the steps of:
   (a) processing each one of the plurality of polygons at least one scan-line at a time, wherein the scan-line currently being processed is the current scan-line;
   (b) separating the processing of the current scan-line into a first case and a second case, the first case processing a plurality of visible points and the second case processing a plurality of non-visible points;
   (c) placing a first sentinel at the end of the scan-line to control processing of the first case.
   (d) placing a second sentinel at the end of the scan-line to control processing of the second case.
   (e) during processing of the first case.
      (e1) updating the intensity value of each point in the frame buffer.
      (e2) updating the depth value of each point in the z-buffer.
      (e3) calculating the intensity value for each point from the intensity value of the previous point, and
      (e4) calculating the depth value for each point from the depth value of the previous point, and
      (e5) terminating processing of the front case when a comparison between the depth value for a point and the depth value in the z-buffer for that point indicates that the point is not visible; and
   (f) during processing of the second case.
      (f1) calculating the depth value for a point from the depth value of a previous point, and
      (f2) terminating processing of the second case when a comparison between the depth value for a point and the depth value in the z-buffer for that point indicates that the point is visible, whereby, intensity values of non-visible points are not processed.

44. A method as in claim 43 wherein the first sentinel step (c) further includes the step of setting the first sentinel equal to the closest value possible in the z-buffer.

45. A method as in claim 44 wherein the second sentinel step (d) further includes the step of setting the second sentinel equal to the farthest value possible in the z-buffer.

46. A method as in claim 45 wherein the terminating step (e5) further includes the step of terminating the processing of the first case when a comparison between the depth value for a point and the first sentinel indicates that the point is the last in the scan-line.

47. A method as in claim 46 wherein the terminating step (f2) further includes the step of terminating the processing of the second case when a comparison between the depth value for a point and the second sentinel indicates that the point is the last in the scan-line.

48. A method as in claim 47 wherein the intensity value includes a red value, a green value, and a blue value.

* * * * *